Lewis Righter's Tire on Wheels of Vehicles

No. 121,663.      Patented Dec. 5, 1871.

Witnesses.
Geo. L. Evert
Jas. E. Hutchinson

Inventor.
Lewis Righter
per
Alexander Mason
atty.

# UNITED STATES PATENT OFFICE.

LEWIS RIGHTER, OF SALEM, OHIO.

IMPROVEMENT IN TIRES FOR WHEELS OF VEHICLES.

Specification forming part of Letters Patent No. 121,663, dated December 5, 1871; antedated November 25, 1871.

*To all whom it may concern:*

Be it known that I, LEWIS RIGHTER, of Salem, in the county of Columbiana and in the State of Ohio, have invented certain new and useful Improvements in Tires for Wheels of Vehicles; and do hereby declare that the following is a full, clear, and exact description thereof, reference being had to the accompanying drawing and to the letters of reference marked thereon.

The nature of my invention consists in a tire having a longitudinal groove on its under side, and inward-projecting flanges at the edges for the purpose of keeping the tire secure and straight with the rim or felly. It also consists in a tire fluted or corrugated longitudinally on the outside to cause the wheel to run more steady and save material.

In order to enable others skilled in the art to which my invention appertains to make and use the same, I will now proceed to describe its construction and operation, referring to the annexed drawing which forms a part of this specification, and in which—

Figure 1:
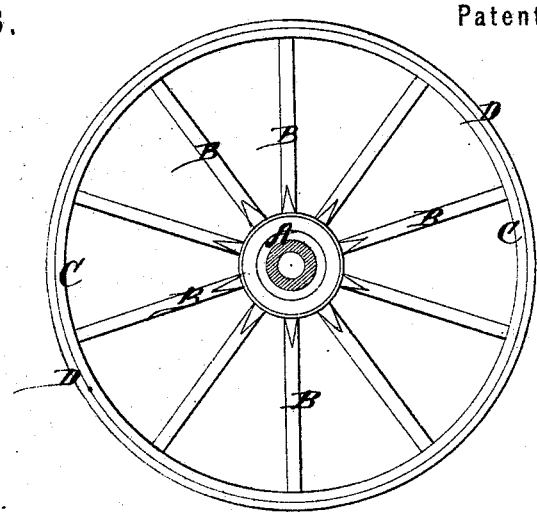
Figure 2:
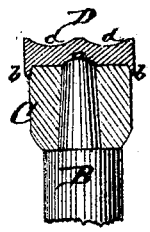
Figure 3:

Figure 1 is a side view of the wheel. Fig. 2 is a transverse vertical section through the tire and felly, and Fig. 3 is an outside view of a portion of the tire.

A represents the hub; B B, the spokes; and C the felly of a wheel for vehicles made in any of the known and usual ways. D represents the tire, which is made wider than the felly C, and provided on its under side with a longitudinal groove or concave, *a*, into which the tenons of the spokes B B enter, as shown in Fig. 2, forming an additional support. At the edges of the tire are inward projecting flanges *b b*, the object of which is to compel the tire to keep its place at all times. By these means the tire is made more secure than in the ordinary way, and also prevents the paint from chafing off. The outer side of the tire is provided with two or more corrugations or flutings *d d*, which causes the wheel to run more steady, and also saves material. The concave *a* and flanges *b b* may be used on a tire with a smooth outer surface; and the flutings *d d* may be used with a tire having a smooth inner surface; but I prefer to use a tire having both.

Having thus fully described my invention, what I claim as new, and desire to secure by Letters Patent, is—

A tire D, provided with an inner central groove, *a*, and inner-projecting flanges *b b*, either with or without a corrugated or fluted exterior surface, substantially as described.

In testimony that I claim the foregoing improvement in tire for wheels of vehicles, I have hereunto set my hand this 19th day of April, 1871.

LEWIS RIGHTER.

Witnesses:
J. W. RIGHTER,
O. W. JONES.

(31)